Aug. 25, 1970  KOICHI KUBOTA  3,525,274

MOTOR CAR TRANSMISSION FOR DISABLED PERSON

Filed April 26, 1968

United States Patent Office 3,525,274
Patented Aug. 25, 1970

3,525,274
MOTOR CAR TRANSMISSION FOR DISABLED PERSON
Koichi Kubota, Kyoto, Japan, assignor to Shimpl Kogyo Kabushiki Kaisha, Kyoto, Japan, a corporation of Japan
Filed Apr. 26, 1968, Ser. No. 724,343
Claims priority, application Japan, May 4, 1967, 42/28,357
Int. Cl. B60k 17/00
U.S. Cl. 74—796
2 Claims

ABSTRACT OF THE DISCLOSURE

A transmission device by which the power input, at constant speed, is transmitted to the output through an infinitely variable transmission which operates as a servomotor. The transmission ratio may be continuously varied, by hand for example, in either direction from a neutral position and the output of the transmission tends to return the transmission ratio to the neutral position so that the output is effective only as long as the first variation of the transmission ratio is continued.

---

This invention relates to a motor vehicle for a disabled person who cannot use legs for driving.

It is a principal object of the present invention to provide a motor vehicle which is driven by a disabled person safely.

It is another object of the present invention to provide a motor vehicle which is driven easily and effortlessly by a disabled person.

The foregoing as well as other objects and advantages will become more apparent from the following description of an embodiment when read in connection with the accompanying drawings in which.

Figure 1:
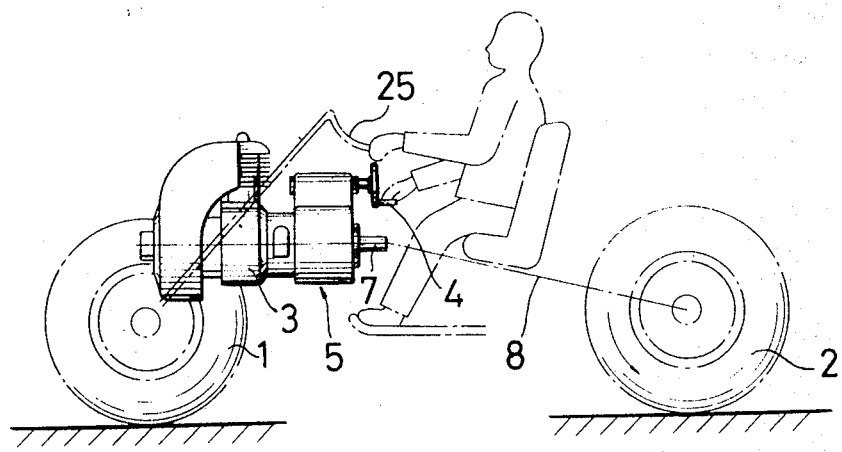
FIG. 1 is a schematic drawing of a motor vehicle according to the present invention.

Referring to FIG. 1, front wheels 1, rear wheels 2 and an engine 3 are accommodated to the motor vehicle in a way similar to motor cars of known type. The engine 3 can be substituted by an electric motor.

The output shaft of engine 3 rotates at a constant speed. For this purpose a speed governor may be provided for the engine 3. This speed governor may vary the degree of opening of the throttle valve of engine 3 depending on load. Accordingly, in the case of a motor vehicle according to the present invention, there is no relation between the rotating speed of engine shaft and that of wheels 1 and 2. This is an important point for the omission of accelerator pedal. The rotating speed of wheels are varied by a handle 4, and when the handle 4 is rotated, the wheels 1 and 2 rotate at a speed corresponding to that of the rotation of handle 4. The engine 3 drives an input shaft 6 of mechanical servomotor 5 (see FIG. 2) and the output shaft 7 of this mechanical servomotor drives the rear wheels 2 through a conventional power transmission system including a propeller shaft, a differential gear and rear axles.

Figure 2:
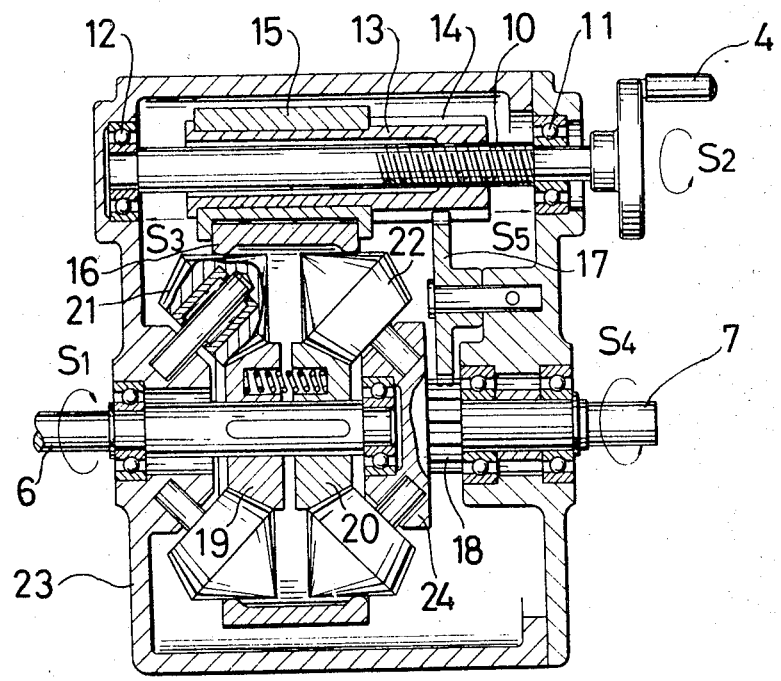
FIG. 2 is a longitudinal sectional view of a servomotor which is employed in the motor vehicle shown in FIG. 1.

FIG. 2 shows an example of mechanical servomotor 5 according to the present invention. As shown in this figure, the handle 4 is attached to a feed screw 10 which is rotatably supported by ball bearings 11 and 12. These bearings 11 and 12 also stop any axial movement of the feed screw 10. The feed screw 10 engages with a feed nut 13 which is moved axially when the handle 4 is turned by a driver. A gear portion 14 with long teeth is provided on the outside of feed nut 13. The feed nut 13 carries a fork member 15 which engages with a rotatable ring 16. The gear portion 14 engages with an intermediate gear 17 and the intermediate gear 17 engages with a gear 18 on the output shaft 7 in turn.

A pair of cone wheels 19, 20 are keyed to the input shaft 6 which is driven by the engine 3 at a constant speed. These cone wheels 19, 20 frictionally engage with a plurality of composite cone wheels 21, 22 respectively. In this specification the term "composite cone wheel" means a cone wheel which as two coaxial conical surfaces of opposite direction. The shafts of composite cone wheels 21 are supported by a casing 23 and the shafts of composite cone wheels 22 are supported by a member 24 on the output shaft 7. The ring 16 frictionally engages with the composite cone wheels 21, 22.

The device including the input shaft 6, the output shaft 7, the cone wheels 19, 20, the composite cone wheels 21, 22 and the ring 16 is of a known type of variable speed change gear. The direction of rotation of the output shaft 7 changes when the ring 16 is shifted from its central or neutral position, and when the ring is in its neutral position, the speed of the output shaft is zero. The greater the distance from the neutral position of the ring 16 the faster the output shaft 7 rotates. The ring 16 is shown on its neutral position in FIG. 2.

The engine 3 rotates the input shaft 6 in the direction $S_1$ at a constant speed and the feed screw 10 has a right-handed thread. When the handle 4 is turned in the direction $S_2$ to shift the ring 16 in the direction $S_3$ (leftwards), the output shaft 7 turns in the direction $S_4$ to drive the wheels 2 forwardly through the power transmission system 8. The rotation of output shaft 7 is also transmitted to feed nut 13 through the intermediate gears 18, 17 and 14. Accordingly, the feed nut 13 is urged in the direction $S_5$ so as to restore the ring 16 to its neutral position except for the rotation of handle 4. The ring 16 would be restored to its neutral position in a short time when the handle 4 is stopped, but, if the handle 5 is continuously turned, the output shaft 7 will rotate at a speed corresponding to the speed of rotation of handle 4. The relation between the speed of rotation of handle 4 and that of output shaft 7 is shown by the following equation.

$$\frac{\text{speed of rotation of the handle 4}}{\text{speed of rotation of the output shaft 7}} = k$$

wherein $k$ is a constant which rotates to the gear ratio between the gear portion 14 and the gear 18. This constant $k$ is chosen to obtain a moderate running speed of the motor vehicle. It will be understood that the motor vehicle will move backwards when the handle 4 is turned opposite to the direction $S_2$ so as to move ring 16 to the right. The constant $k$ in the above equation does not relate to the pitch of feed screw 10, but this pitch relates to the response speed between the (turning of the handle 4 and the output rotation of the shaft 7).

The steering handle 25 is manipulated by one hand of the driver and the handle 4 for speed regulation is manipulated by other hand of the driver. As the turning of handle 4 is an operation for transmitting a signal into a servomotor, the motor car can be driven with little effort. There is provided no brake pedal. This is an important feature of the motor vehicle together with the omission of the accelerator pedal. The braking action is achieved by the servomotor. To stop rotation of handle 4 means to break the vehicle. In this way, the servomotor provided according to the present invention serves also as a brake.

I claim:
1. In a power transmission device having an input shaft rotatable at a constant speed, an output shaft and means for infinitely varying the transmission ratio between said shafts, the improvement comprising laterally displaceable means for actuating the means for varying the transmission ratio, means for varying the displace- ment of said actuating means in one direction or the other away from a neutral position to establish both the speed and direction of rotation of said output shaft for a given direction of rotation of said input shaft and means driven by the output shaft for varying the displacement of said actuating means in the opposite direction toward the neutral position whereby the instant position of said actuating means for varying the transmission ratio is constantly determined by the relative variations of displacement of said actuating means in the opposed directions.

2. In a variable speed power transmission device having an input shaft, an output shaft and means for varying the transmission ratio between said shafts, the improvement comprising a feed screw mounted to rotate about its own axis and restrained from axial movement, a feed nut rotatably mounted on and engaged with said feed screw, non-rotatable means carried by said feed nut for engaging the means for infinitely varying the transmission ratio and means driven by the output shaft for rotating said feed nut on the feed screw whereby said non-rotatable means may be moved along the axis of said feed screw by said feed nut by rotation of said feed screw and in the opposite direction by rotation of said feed nut by the output shaft so that the speed and direction of rotation of the output shaft is determined by the speed and direction of rotation of the feed screw.

References Cited

UNITED STATES PATENTS

| | | | |
|---|---|---|---|
| 1,214,643 | 2/1917 | Boker | 180—70 |
| 2,472,450 | 6/1949 | Van Vleck | 180—53 |
| 3,127,793 | 4/1964 | Kashihara | 74—796 |

KENNETH H. BETTS, Primary Examiner

U.S. Cl. X.R.

180—70